United States Patent [19]

Casull

[11] 4,256,071
[45] Mar. 17, 1981

[54] TORCH CHAMBER APPARATUS AND METHOD FOR A SPARK PLUG OF AN INTERNAL COMBUSTION ENGINE

[75] Inventor: Don C. Casull, Salt Lake City, Utah

[73] Assignee: Deseret Automotive Research, Inc., Salt Lake City, Utah

[21] Appl. No.: 7,128

[22] Filed: Jan. 29, 1979

[51] Int. Cl.³ .............................................. F02B 19/18
[52] U.S. Cl. .................................. 123/266; 123/273; 123/286
[58] Field of Search ......... 123/169 R, 169 P, 169 PA, 123/169 EL, 32 C, 32 K, 32 SP, 191 S, 191 SP

[56] References Cited

U.S. PATENT DOCUMENTS

| | | | |
|---|---|---|---|
| 1,304,688 | 5/1919 | Kelly | 123/169 PA |
| 1,522,551 | 1/1925 | Shepherd | 123/169 PA |
| 2,127,512 | 8/1930 | Harper | 123/169 P |
| 3,926,158 | 12/1975 | Dolza | 123/191 S |
| 4,059,079 | 11/1977 | Kasima et al. | 123/191 S |
| 4,127,095 | 11/1978 | Noguchi et al. | 123/191 S |
| 4,175,501 | 11/1979 | Noguchi et al. | 123/32 SP |

Primary Examiner—Craig R. Feinberg
Attorney, Agent, or Firm—H. Ross Workman; J. Winslow Young; Rick D. Nydegger

[57] ABSTRACT

A torch chamber apparatus and method for providing a more thorough combustion of a fuel/air mixture in a combustion chamber of a cylinder of an internal combustion engine. The torch chamber is configurated as a hollow, cylindrical body having a jet nozzle and external threads at a first end and an axial, internally threaded, spark plug-receiving opening at the second end. A diametrally enlarged shoulder, wrench engagement nut with an indicia thereon is also included at the second end. The dimensions of the hollow cylindrical body and the shoulder are selectively predetermined to adapt the torch chamber to be inserted into a spark plug access bore with a deformable gasket sealingly engaged between the shoulder and the rim of the access bore. The method includes interposing the torch chamber between the spark plug and the combustion chamber while aligning the jet nozzle inside the combustion chamber by viewing the indicia.

2 Claims, 3 Drawing Figures

TORCH CHAMBER APPARATUS AND METHOD FOR A SPARK PLUG OF AN INTERNAL COMBUSTION ENGINE

BACKGROUND

1. Field of the Invention

This invention relates to torch chambers and, more particularly, to a torch chamber adapted to be interposed between a spark plug and a combustion chamber in a cylinder of an internal combustion engine.

2. The Prior Art

A conventional spark-initiated internal combustion engine requires an electrical spark to ignite the fuel/air mixture in the combustion chamber. Improving the efficiency of fuel/air combustion has been the goal of numerous prior art patents. For example, devices for improving ignition are set forth in U.S. Pat. Nos. 3,102,521; 2,032,986; 2,723,653; 3,926,169; 1,181,122; 3,908,625; 3,809,039; 3,066,662; and 3,968,782 and Japanese Pat. Nos. 44-6641 and 46-39167. These references variously relate to the principle of injecting a timed, ignition (flame into the combustion chamber, the flame providing a substantially improved ignition over that of the conventional electrical spark. In particular, it is believed that an ignition flame, commonly called a torch flame, sprays throughout the combustion chamber and thereby improves ignition of the explosive fuel/air mixture. This is an improvement over the conventional, high voltage electric spark since the ignition temperature and, therefore, the flame front therefrom, rapidly deteriorates with distance from the spark source. This degradation of the flame front results, in part, from a portion of the thermal energy in the flame front being absorbed by the cooler fuel/air mixture in raising the fuel/air mixture to the ignition temperature. The resulting incomplete combustion experienced with a conventional spark-initiated combustion cycle is reflected in lower energy output and increased fuel consumption.

In view of the foregoing, it would be a significant advancement in the art to provide an apparatus and method for modifying a conventional spark-initiated, internal combustion engine for operation by a torch-initiated combustion system. It would also be an advancement to provide a torch chamber which may be readily interposed between a spark plug and the conventional spark plug opening of an internal combustion engine. It would also be an advancement in the art to provide a torch chamber which modifies a conventional spark plug-initiated internal combustion engine for operation as a torch-initiated ignition engine for improved ignition of the fuel/air mixture. Such an apparatus and method is disclosed and claimed herein.

BRIEF SUMMARY AND OBJECTS OF THE INVENTION

The present invention relates to a novel torch chamber apparatus and method for modifying a conventional spark-initiated internal combustion engine with a torch chamber wherein the torch chamber is readily adapted to be interposed between a spark plug and a combustion chamber thereby providing the internal combustion engine with a torch ignition system. The torch chamber is adapted to be selectively oriented with its jet nozzle in a predetermined position inside the combustion chamber. The jet nozzle sprays the torch flame into the combustion chamber providing improved ignition therein. The flame for the torch ignition is provided by igniting fuel/air in the torch chamber with a conventional spark plug.

It is, therefore, a primary object of this invention to provide improvements in a torch chamber for an internal combustion engine.

Another object of this invention is to provide an improved method for initiating an ignition flame in a cylinder of an internal combustion engine.

Another object of this invention is to provide a torch chamber adapted to be placed in the conventional spark plug opening of the internal combustion engine and to receive a spark plug therein.

Another object of this invention is to provide a torch chamber having a jet nozzle adapted to be oriented in a predetermined direction inside the combustion chamber.

Another object of this invention is to provide a torch chamber that is adapted to be sealingly engaged in a spark plug access port.

These and other objects and features of the present invention will become more fully apparent from the following description and appended claims taken in conjunction with the accompanying drawing.

DETAILED DESCRIPTION OF THE PREFERRED EMBODIMENTS

Figure 3:
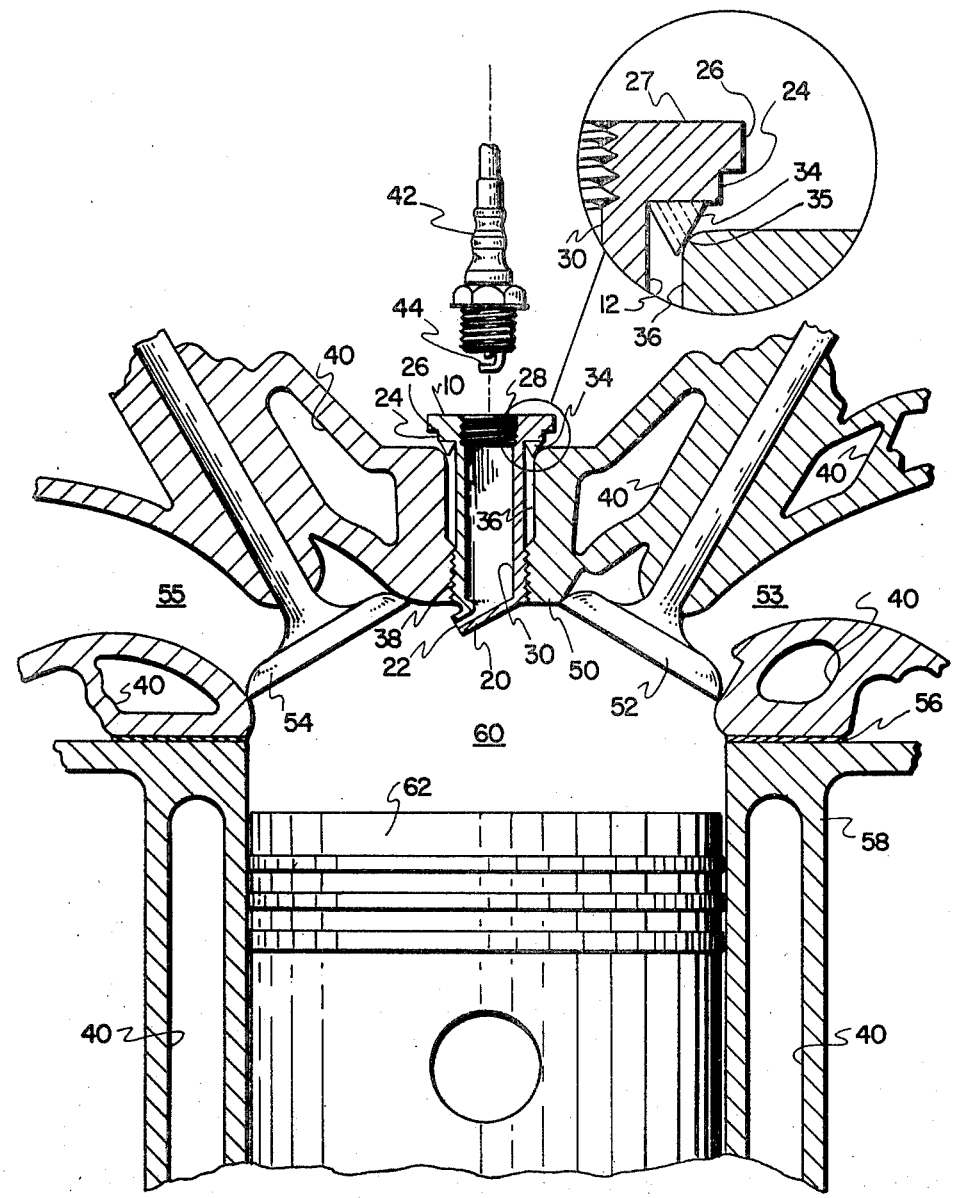
FIG. 3 is a partial, cross-sectional view of the environment of a combustion chamber of an internal combustion engine (in combination with a spark plug shown in exploded relationship) with the torch chamber of this invention shown in cross section and including an enlarged view of a portion of the interrelationship between the torch chamber and the spark plug access port.

The invention is best understood by reference to the drawing wherein like parts are designated with like numerals throughout.

Figures 1, 2:
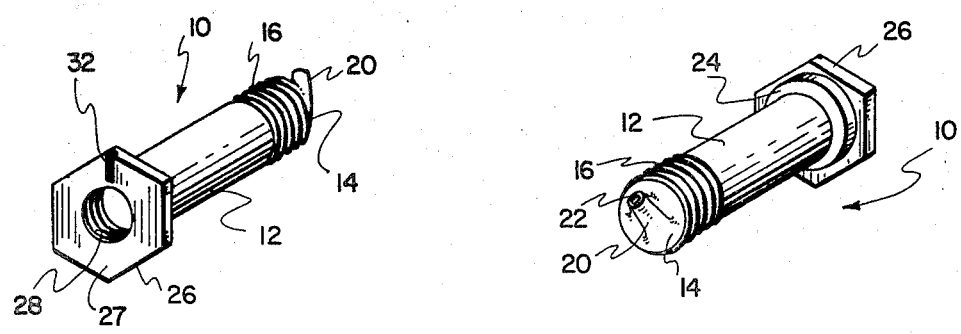
FIG. 1 is a perspective view of the spark plug-receiving end of a first preferred embodiment of the torch chamber of this invention.
FIG. 2 is a perspective view of the jet nozzle end of the torch chamber of FIG. 1.

Referring now more particularly to FIGS. 1 and 2, a first preferred embodiment of the torch chamber of this invention is shown generally at 10 and includes a hollow, cylindrical body 12 closed off at a first end 14 in a jet nozzle 20. Jet nozzle 20 includes a jet port 22 communicating with the interior of ignition chamber 30 (FIG. 1) of torch chamber 10. Jet nozzle 20 is a nozzle oriented downwardly at approximately 45° from the axis of torch chamber 10. This particular orientation is believed to impart a desired swirling action to provide a more thorough ignition of the fuel/air mixture in combustion chamber 60 (FIG. 1). External threads 16 are formed on the exterior of first end 14 and are dimensionally adapted to be received in a conventional spark plug opening 38 (FIG. 1).

A second end 27 includes a centrally disposed, internally threaded, spark plug-receiving opening 28 dimensionally adapted to receive a conventional spark plug therein. Second end 27 also includes a wrench-engagement surface or nut 26 to accommodate using a conventional wrench apparatus (not shown) for securing torch chamber 10 in cylinder head 50 (FIG. 1) as will be set forth more fully hereinafter. An indicia 32 is formed in the face of nut 26 and corresponds with the alignment of jet nozzle 20 to facilitate alignment of jet nozzle 20 inside the combustion chamber 60 (FIG. 1) as will be set forth in more detail hereinafter. Second end 27 also includes a raised annular shoulder 24 (FIGS. 1 and 3). The function of shoulder 24 will be set forth more fully hereinafter with respect to the detailed discussion of FIG. 1 and, more particularly, the enlarged view therein.

Referring now more particularly to FIG. 3, a conventional combustion chamber 60 is shown as formed by a piston 62 operating in a cylinder 58 with the remainder of the combustion chamber 60 being formed by a cylinder head 50 sealed to cylinder 58 by gasket 56. Valves 52 and 54 provide the appropriate intake and exhaust valves for incoming fuel/air mixture in intake 53 and outgoing combustion products into exhaust 55, respectively. Included within the apparatus of the conventional internal combustion engine are a plurality of coolant channels 40 throughout. The apparatus of cylinder 58, piston 62, cylinder head 50, intake valve 52, exhaust valve 54 and a spark plug 42 are all known components of a conventional internal combustion engine and are set forth herein to more clearly illustrate the environment for torch chamber 10 of this invention.

A conventional spark plug access port 36 is formed in cylinder head 50 and terminates in the female threads of spark plug opening 38. The upper end of spark plug access port 36 forms an annular rim 35 (see enlarged view). Spark plug access port 36 is diametrally enlarged relative to threads 38 to provide access for a spark plug, such as spark plug 42, threadedly engaged in opening 38. More particularly, as is well known in the prior art, each spark plug includes a nut portion for the purpose of engaging a suitable socket wrench (not shown) for the purpose of securing and removing the spark plug in opening 38. Accordingly, spark plug access port 36 accommodates receipt of a suitable socket wrench (not shown) while in engagement with the corresponding nut portion of the spark plug.

The length of torch chamber 10 and the diameter of shoulder 24 are selectively predetermined so that a deformable gasket 34 can be pressed against rim 35 thereby forming part of a sealed enclosure around body 12. This sealed enclosure isolates body 12 against excessive thermal energy losses to coolant in coolant channels 40. With particular reference to the enlarged view, deformable gasket 34 is shown having a triangular cross section with the base of the triangular cross section in juxtaposition against the face of shoulder 24. Deformable gasket 34 is fabricated from a suitable material such as copper, or the like, and accommodates being crushed against rim 35 thereby allowing an operator (not shown) to suitable orient the position of jet nozzle 20 inside combustion chamber 60. In particular, the operator is able to view indicia 32 (FIG. 1) and selectively crush deformable gasket 34 to provide a suitable orientation of jet nozzle 20.

The dimensions of threads 16 are selectively predetermined to accommodate placement of torch chamber 10 in cylinder head 50 so that jet nozzle 20 is positioned at approximately the same position as would be occupied by spark gap 44 if a spark plug corresponding to spark plug 42 were engaged therein.

It should be noted that while spark plug 42 is shown as a conventional spark plug having a spark gap 44, the dimensions of spark plug 42 are smaller than a spark plug for receipt in opening 38 since spark plug 42 must fit in the diametrally smaller opening 28 while torch chamber 10 is engaged in opening 38. However, since spark plug 42 is a conventional spark plug, all references to spark plug 42 herein will be assumed to be references to a conventional spark plug suitable for the purposes set forth and described.

Combustion chamber 60 illustrated herein is the combustion chamber of a conventional, four-cycle, internal combustion engine. During operation, a fuel/air mixture is drawn from intake 53 through an opened intake valve 52 while a portion of the fuel/air mixture is also drawn into ignition chamber 30. During the compression stroke by piston 62, the fuel/air mixture in combustion chamber 60 is suitably compressed until a timed spark to spark gap 44 initiates combustion of the fuel/air mixture in ignition chamber 30. The flame created thereby sprays outwardly through jet port 20 igniting the remainder of the fuel/air mixture in combustion chamber 60. Thereafter, the conventional four-cycle sequence continues.

Surprisingly, it has been discovered that it is unnecessary to alter either the timing for the electrical energy to spark plug 42 or the ratio of fuel and air in the fuel/air mixture in intake 53. Accordingly, while the incoming fuel/air mixture from intake 53 remains the same as with a conventional spark-initiated combustion, the primary advantage of the present invention is that the ignition flame initiated in ignition chamber 30 provides a more thorough or complete combustion of the fuel/air mixture in combustion chamber 60. The resulting improved thoroughness of combustion provides a corresponding increase in power while decreasing the overall fuel requirement.

Currently, it is not understood how fuel/air mixture is drawn through jet nozzle 20 into ignition chamber 30. One theory postulated is that the subsequent cooling of the superheated ignition gases surrounding spark 44 causes a slight negative pressure condition while allows the next surge of fuel/air mixture to enter. Another theory is that the foregoing phenomena is coupled with phenomena associated with high velocity ejection flame from jet nozzle 20 to provide the necessary reduced pressure condition. Regardless of the actual mechanism involved, it has been experimentally demonstrated that there is negligible stagnation, if any, inside ignition chamber 30.

Torch chamber 10 and, more particularly, jet nozzle 20 is aligned relative to exhaust valve 54 so as to direct the ignition flame ejected through jet port 22 generally toward exhaust valve 54. While the precise mechanism involved in this invention is not clear at the present, it has been discovered that a surprisingly improved ignition of the fuel/air mixture in combustion chamber 60 is attained when jet nozzle 20 is oriented at an acute angle relative to exhaust valve 54. While further experimental endeavors may disclose that an orientation of jet nozzle 20 other than the foreqoing may be suitable, the present experimental results have shown that the preferred orientation is generally toward exhaust valve 54.

Experimentally, an eight cylinder engine of an automobile was modified using the torch chamber 10 of this invention. The automobile was driven an extended distance to test this invention. Surprisingly, the torch chamber 10 of this invention provided a significant reduction in the measured fuel consumption without decreasing the overall performance of the automobile. While the precise operation of torch chamber 10 is not clearly understood, particularly as to the mass transfer of materials through jet nozzle 20, the foregoing experimental results have clearly shown that the torch chamber apparatus of this invention is a significant advancement in the art.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes that come within the meaning and range of equivalency of the claims are to be embraced within their scope.

What is claimed and desired to be secured by a United States Letters Patent is:

1. A torch chamber for a combustion chamber of a cylinder of an internal combustion engine, the combustion chamber including intake valve means and exhaust valve means comprising:
    a hollow, cylindrical body having a first, closed end and a second, closed end, the hollow body forming an ignition chamber;
    a single jet nozzle in the first end, the jet nozzle being oriented downwardly at an angle of about 45° from the axis of the hollow, cylindrical body and thereby providing a passageway through the first end;
    alignment means on the body for orienting the jet nozzle at an acute angle toward only the exhaust valve means thereby directing an ignition flame originating inside the ignition chamber in a predetermined direction into the combustion chamber at the exhaust valve means;
    a first thread means exteriorily formed adjacent the first end and adapted to threadedly engage a conventional threaded, first spark plugreceiving opening into a combustion chamber;
    a coaxial, second spark plug-receiving opening in the second, closed end, the opening having thread means interiorily formed therein and adapted to threadedly engage a spark plug;
    an annular shoulder circumscribing the cylindrical body adjacent the second end and having a diameter incrementally greater than a rim of an access port to the threaded spark plug-receiving opening in the combustion chamber;
    deformable gasket means for placement between the rim and the annular shoulder to accommodate deformation upon tightening of the first thread means in the first spark plug-receiving opening; and
    wrench engagement means adjacent the second end to accommodate tightening the first thread means in the first spark plug-receiving opening and cause deformation of the deformable gasket means.

2. The torch chamber defined in claim 1 wherein the external diameter of the hollow, cylindrical body is incrementally less than the internal diameter of the access port to the first, threaded spark plug-receiving opening thereby providing a spaced relationship surrounding the hollow, cylindrical body.

* * * * *